(12) United States Patent
Hamano et al.

(10) Patent No.: US 7,749,657 B2
(45) Date of Patent: *Jul. 6, 2010

(54) POSITIVE ELECTRODE MATERIAL FOR LITHIUM SECONDARY BATTERY, METHOD FOR PRODUCING THE SAME, AND LITHIUM SECONDARY BATTERY

(75) Inventors: Yoshiaki Hamano, Chiba (JP); Hidefumi Konnai, Chiba (JP)

(73) Assignee: JFE Mineral Company Ltd., Tokyo (JP)

( * ) Notice: Subject to any disclaimer, the term of this patent is extended or adjusted under 35 U.S.C. 154(b) by 1545 days.

This patent is subject to a terminal disclaimer.

(21) Appl. No.: 10/713,114

(22) Filed: Nov. 17, 2003

(65) Prior Publication Data

US 2004/0110066 A1 Jun. 10, 2004

(30) Foreign Application Priority Data

Dec. 6, 2002 (JP) ............................. 2002-355936

(51) Int. Cl.
*H01M 6/04* (2006.01)
(52) U.S. Cl. ..................... 429/223; 429/224; 429/218.1
(58) Field of Classification Search ........................ None
See application file for complete search history.

(56) References Cited

U.S. PATENT DOCUMENTS 5,679,481 A * 10/1997 Takanishi et al. ........... 429/223

2002/0192552 A1 * 12/2002 Lampe-Onnerud et al. .. 429/223
2004/0076884 A1 * 4/2004 Lee et al. ................. 429/231.3

FOREIGN PATENT DOCUMENTS

| JP | 0 712 172 A2 | 11/1995 |
| JP | A 09-17430 | 1/1997 |
| JP | 0 849 817 A2 | 12/1997 |
| JP | A 10-79250 | 3/1998 |
| JP | A 11-310416 | 11/1999 |
| JP | 1 265 300 A2 | 6/2002 |

* cited by examiner

*Primary Examiner*—Patrick Ryan
*Assistant Examiner*—Cynthia Lee
(74) *Attorney, Agent, or Firm*—Oliff & Berridge, PLC

(57) ABSTRACT

A positive electrode material for a lithium secondary battery which is high in safety, high in capacity, excellent in rate performance and high temperature storage performance and high in charge/discharge efficiency is provided. The positive electrode material for a lithium secondary battery is obtained by adding Al to a Li—Ni—Co—Ba—O system raw material or preferably by adding Al and an amorphous phase of an oxide thereto. The positive electrode material for a lithium secondary battery is a composite oxide having a total composition represented by $Li_aNi_bCo_cBa_dAl_eO_x$ or $Li_aNi_bCo_cBa_dAl_eM_fO_x$ where M: one or more elements selected from the group consisting of Li, Na, K, Si, Ba, B, P and Al
a: 1.0 to 1.2 mol
b: 0.5 to 0.95 mol
c: 0.05 to 0.5 mol
d: 0.0005 to 0.01 mol
e: 0.01 to 0.1 mol
f: 0.01 mol or less (not inclusive of 0).

10 Claims, No Drawings

POSITIVE ELECTRODE MATERIAL FOR LITHIUM SECONDARY BATTERY, METHOD FOR PRODUCING THE SAME, AND LITHIUM SECONDARY BATTERY

BACKGROUND OF THE INVENTION

1. Field of the Invention

The present invention relates to a positive electrode material for a lithium secondary battery, to a method for producing the same, and to a lithium battery using the same. More particularly, it relates to a novel material obtained by improving a positive electrode material for a lithium secondary battery having a Li—Ni—Co—Ba—O system composition, to a method for producing the same, and to a lithium secondary battery using the novel material.

2. Description of the Related Art

Recent years have seen various improvements in a positive electrode material for a lithium secondary battery. As a positive electrode material for a high-capacity secondary battery, a material having a Li—Ni—Co—O or Li—Ni—Co—Ba—O system composition can be listed.

For example, there is a positive electrode material which is a compound represented by a chemical formula $Li_{1-x-a}A_xNi_{1-Y-b}B_YO_2$ where A: one alkaline earth metal element of either strontium or barium, or at least two alkaline earth metal elements selected from magnesium, calcium, strontium and barium B: at least one transition metal element other than Ni X: a total number of moles of A and $0 < X \leq 0.10$ Y: a total number of moles of B and $0 < Y \leq 0.30$ a: $-0.10 \leq a \leq 0.10$ b: $-0.15 \leq b \leq 0.15$ (see, e.g., Japanese Unexamined Patent Publication No. HEI 9-17430 (pp. 2-8)).

There is another positive electrode material which is a compound represented by a chemical formula $Li_{1-x-a}A_xNi_{1-Y-b}B_YO_2$ and forming secondary particles with an average diameter of 5.0 μm to 50 μm as an aggregate of primary particles with an average diameter of 0.01 μm to 5.0 μm where A: strontium or barium B: at least one transition metal element X: a total number of moles of strontium or barium and $0 < X \leq 0.10$ Y: a total number of moles of all transition metal elements other than Ni and $0 < Y \leq 0.30$ a: $-0.10 \leq a \leq 0.10$ b: $-0.15 \leq b \leq 0.15$ (see, e.g., Japanese Unexamined Patent Publication No. HEI 10-79250 (pp. 2-7)).

Although the foregoing materials contribute to excellency in cycle performance of a secondary battery when used in a positive electrode for a lithium secondary battery, no mention has been made to the thermal stability, capacity, rate performance, and charge/discharge efficiency and high temperature storage performance thereof.

The present inventors had conducted research on a positive electrode material for a lithium secondary battery, made a further examination of an amount of Ba in Li—Ni—Co—Ba—O system technology, and proposed a material giving a high thermal stability and a large capacity with a limited range of Ba content (see, e.g., Japanese Unexamined Patent Publication No. 2001-173285 (pp. 3-11)).

As a result of further pursuing research on the improvement of the properties of the positive electrode material for a lithium secondary battery, the present inventors have developed a material.

SUMMARY OF THE INVENTION

It is therefore an object of the present invention to provide a novel positive electrode material for a lithium secondary battery which is high in safety and high in capacity and excellent in rate performance, charge/discharge efficiency, and high temperature storage performance, to a method for producing the same, and to a lithium secondary battery.

The present invention is a positive electrode material for a lithium secondary battery which is a composite oxide powder having a total composition represented by $Li_aNi_bCo_cBa_dAl_eO_x$ where a/(b+c): 1.0 to 1.2 b/(b+c): 0.5 to 0.95 c/(b+c): 0.05 to 0.5 d/(b+c): 0.0005 to 0.01 e/(b+c): 0.01 to 0.1 b+c=1 x: not specified.

By mixing 0.01 to 0.1 mol of Al in a Li—Ni—Co—Ba—O system composite oxide, the rate of Li ion diffusion is increased within the positive electrode material or at a surface thereof during charge/discharge operations so that the effect of preventing a reduction in capacity is observed even during a battery action with a large current applied. Accordingly, improvements in power output performance required of a lithium secondary battery for use in an automotive vehicle or the like can be expected. Furthermore, because of a stable crystal structure during charging, reduction in capacity can be prevented even under high temperature environmental conditions.

If an amorphous phase of an oxide is dispersed within a particle of the composite oxide, the following effects are expected. Improved permeability of an electrolyte leads to the effect of increasing the discharge capacity and the charge/discharge efficiency. In addition, the falling off of the positive electrode material can be prevented even during expansion or shrinkage of a crystal structure caused by the charge/discharge operations, thereby allowing improved cycle performance. Furthermore, it is also effective in preventing gelation in the process of producing an electrode and increasing the electrode density.

Preferably, a constituent component of the amorphous phase of the oxide is an oxide of one or a plurality of elements selected from the group consisting of Li, Ba, and Al, which allows easy formation of the amorphous phase of the oxide.

The positive electrode material for a lithium secondary battery according to the present invention is generally a multiple oxide having a total composition represented by $Li_aNi_bCo_cBa_dAl_eM_fO_x$ where M: one or a plurality of elements selected from the group consisting of Na, K, Si, B, and P, a/(b+c): 1.0 to 1.2 b/(b+c): 0.5 to 0.95 c/(b+c): 0.05 to 0.5 d/(b+c): 0.0005 to 0.01 e/(b+c): 0.01 to 0.1 f/(b+c): 0.01 or less (not inclusive of 0)

b+c=1 x: not specified.

The foregoing positive electrode material for a lithium secondary battery can be produced by following methods.

(a) Ba and Al raw materials are added to a Li—Ni—Co—O system raw material and the resulting raw material mixture is fired.

(b) a component for forming an amorphous phase of an oxide is mixed with the raw material mixture obtained in the case (a) and the resulting mixture is fired. This allows the production of a positive electrode material for a lithium secondary battery having an amorphous phase of an oxide dispersed within a particle of a powder.

(c) After the firing performed in the case (a), a component for forming an amorphous phase of an oxide is further mixed with the raw material mixture and the resulting mixture is re-fired. This allows the production of a positive electrode material for a lithium secondary battery having an amorphous phase of an oxide formed on a surface of a particle of a powder.

(d) After the firing performed in the case (b), a component for forming an amorphous phase of an oxide is further mixed in the mixture and the resulting mixture is re-fired. This allows the production of a positive electrode material for a lithium secondary battery having an amorphous phase of an oxide dispersed within a particle of a powder and formed on a surface thereof.

The present invention also provides a lithium secondary battery comprising a positive electrode composed of any of the foregoing positive electrode materials for a lithium secondary battery.

DETAILED DESCRIPTION OF THE PREFERRED EMBODIMENTS

The present invention provides a positive electrode material for a lithium secondary battery containing a Li—Ni—Co—Ba—O system component as a main component, which is characterized in any one of the following features:

(A) Al is further contained
(B) an amorphous phase of an oxide is contained within a particle
(C) an amorphous phase of an oxide is formed at the surface of the particle, and
(D) an amorphous phase of an oxide is dispersed within a particle and formed at the surface thereof.

The mixing of a proper amount of Al conceivably has the effect of increasing the rate of Li ion diffusion in a Li—Ni—Co—Ba—O system crystal and prevention of crystal structure decomposition under high temperature conditions. Therefore, use of material containing Al in a positive electrode allows improvement of the power output performance, rate performance, high temperature storage performance, and cycle performance of a lithium secondary battery.

Although the action of an amorphous phase of an oxide is not clear, it conceivably has the following effects. The amorphous phase improves permeability of an electrolyte, and thus has the effect of increasing the discharge capacity. In addition, the falling off of the positive electrode material can be prevented even during the expansion or shrinkage of a Li—Ni—Co—Ba—Al—O system composite oxide crystal structure caused by charge/discharge operations, thereby allowing improved cycle performance. Furthermore, it is effective in preventing gelation in the process of producing an electrode and increasing the electrode density.

Furthermore, the elements such as Li, Ba, and Al may be included in the Li—Ni—Co—O system crystal, or may form an amorphous phase.

A component of an amorphous phase of an oxide is one or a plurality of elements selected from the group consisting of Li, Ba, and Al. There are other elements which form an amorphous phase such as Na, K, Si, B and P that were previously described in the definition of M. In addition, elements may be selected from Ca, Mg, Zn, Ti, Sr, Zr, S, Fe, Ge, As, W, Mo, Te, F and the like. These elements may be included in an amorphous phase of an oxide which contains one or a plurality of elements selected from the group consisting of Li, Ba, Al, Na, K, Si, B, and P.

A description will be given herein below to the reason for limiting numerical values.

The present invention has been achieved by improving a conventionally known positive electrode material for a lithium secondary battery containing a Li—Ni—Co—Ba—O system component as a main component.

The following numerical values represent the respective numbers of moles of the individual components when the total composition of a composite oxide as the positive electrode material for a lithium secondary battery according to the present invention is expressed as $Li_aNi_bCo_cBa_dAl_eO_x$ or $Li_aNi_bCo_cBa_dAl_eM_fO_x$ and the total amount of Ni and Co is assumed to be 1 mol. (i.e., b+c=1).

The amount of Li is set to 1.0 to 1.2 mol. If the amount of Li is small, the resulting crystal structure contains a large number of lithium defects so that the capacity lowers. If the amount of Li is excessively large, a lithium hydroxide or a lithium carbonate is generated, which makes it difficult to produce an electrode. Accordingly, the amount of Li is limited to the range of 1.0 to 1.2 mol.

In order to cause a secondary battery to display proper characteristics, enhance the thermal stability, and maintain a high discharge capacity, the amount of Co is set to 0.05 to 0.5 mol.

To enhance the thermal stability, Ba is contained at an amount of 0.0005 to 0.01 mol. It is difficult to provide a proper thermal stability if the amount of Ba is outside the range.

The amount of Al is set to 0.01 to 0.1 mol. If it is less than 0.01, the effect of Li ion diffusion and the like is low. If Al is mixed at an amount in excess of 0.1 mol, the capacity of a battery lowers so that the amount of Al is limited to the range of 0.01 to 0.1 mol.

The total amount of elements which compose an amorphous phase of an oxide to be added as required is set to 0.01 or less. The amount of the amorphous phase of the oxide is preferably set to 0.01 or less since the addition of the amorphous phase of the oxide at an amount in excess of 0.01 mol or more may mainly cause a reduction in discharge capacity.

To produce the Li—Ni—Co—Ba—Al composite oxide, an oxide or a material which forms an oxide through a firing reaction during synthesis in the production process can be used as a raw material.

As a Li source, a hydroxide, a nitrate, or the like is used preferably.

As each of a Ni source and a Co source, an oxide, a hydroxide, a nitrate, or the like can be used. Since uniform mixing of Ni and Co is an important issue, Ni—Co—$(OH)_2$ obtained by, e.g., reactive crystallization process is particularly preferred. Preferably, Ni—Co—$(OH)_2$ is secondary particles having an average diameter of 5 to 20 µm, a Co/(Ni+Co) molar ratio of 0.05 to 0.5, and a tap density of 1.8 g/cm$^3$ or more. The configuration of Ni—Co—$(OH)_2$ is reflected on the configuration of the Li—Ni—Co—Ba—Al composite oxide after the firing reaction.

As a Ba source, a hydroxide, a nitrate, or the like is used.

As an Al source, an oxide, a hydroxide, a nitrate, or the like is preferred.

Alternatively, the present invention further mixes a component for forming an amorphous phase of an oxide in a Li—Ni—Co—Ba—Al—O system raw material and fires the resulting mixture or fires a Li—Ni—Co—Ba—Al—O system raw material, further mixes a component for forming an amorphous phase of an oxide in the fired raw material, and re-fires the resulting mixture. This allows the production of a positive electrode material for a lithium secondary battery having an amorphous phase of an oxide dispersed within a particle of a powder or adhered to the surface thereof.

If a component for forming an amorphous phase of an oxide is mixed in a Li—Ni—Co—Ba—Al—O system raw material, the resulting mixture is fired, a component for forming an amorphous phase of an oxide is further added to the fired material, and the resulting mixture is re-fired, a positive electrode material for a lithium secondary battery having an amorphous phase of an oxide generated within a particle and at the surface thereof can be produced.

The amorphous phase of the oxide generated is dispersed within the particle of the Li—Ni—Co—Ba—Al—O system and/or at the surface thereof.

As a raw material for forming an amorphous phase of an oxide composed of one or more elements selected from Li, Ba, Al, and the like, an oxide or a material which forms an oxide through firing can be used appropriately. Further, the same is true in the case of forming an amorphous phase of an oxide composed of one or more elements selected from Li, Na, K, Si, Ba, P, Al, and the like.

A nitrate of Li or Ba is used preferably and appropriately since the nitrate provides a positive electrode material with an active property, as it is highly reactive during firing to enhance the formation of an amorphous phase, and has a high oxidizing power. Further it does not damage the crystal structure of a Li—Ni—Co—Ba—Al—O system compound as a main component. The present invention is not limited thereto, and similarly a nitrate of Na or K may be used.

For Al, amorphous fine particles having a BET specific surface area of 100 m$^2$/g or more is preferable and appropriate. However, the present invention is not limited thereto. The same is true for Si.

An oxide system amorphous phase composed of one or more elements selected from Li, Ba, Al, and the like acts effectively for the positive electrode material powder according to the present invention. Although an oxide or a material which forms an oxide through firing can be used to form the oxide system amorphous phase, alternatively it is possible to use a glass powder obtained by crushing a produced glass to the Li—Ni—Co—Ba—Al—O system raw material.

Although the firing temperature is selected properly depending on the type of an amorphous phase of an oxide to be formed, firing should be performed preferably in an oxidizing atmosphere at 900° C. or less for the prevention of the degradation of the properties of a battery to which the Li—Ni—Co—Ba—Al—O system composite oxide contribute. The same is applied in the case of an oxide system amorphous phase composed of one or more elements selected from Li, Na, K, Si, Ba, B, P, Al, and the like.

Example 1

As for the raw materials of the Ni and Co sources, three types of Ni—Co—(OH)$_2$ adjusted to have Co/(Ni+Co) molar ratios of 0.1, 0.2, and 0.3 were prepared by reactive crystallization process. As for the other starting raw materials, commercially available chemicals were used, which were:

LiOH.H$_2$O as the Li source,
NaNO$_3$ as the Na source,
KNO$_3$ as the K source,
Ba(NO$_3$)$_2$ as the Ba source,
H$_3$BO$_3$ as the B source,
Al(NO$_3$)$_3$.9H$_2$O as the Al source,
SiO$_2$ as the Si source, and
P$_2$O$_5$ as the P source.

Regarding SiO$_2$, amorphous fine particles were used.

These starting raw materials were selected and weighed to achieve an objective blending composition. Then, the starting raw materials were mixed sufficiently to be used as raw materials for firing. Firing was performed in an oxygen atmosphere. First, the raw materials were held at 400° C. for 4 hours such that moisture in the raw materials were removed therefrom, then, heated at a heating rate of 5° C./minute to the firing temperature and held for a time shown in Table 1. After cooling, the resulting fired material was retrieved from a furnace. The retrieved fired material was ground to provide a positive electrode material powder. The resulting powder was subjected to particle size distribution measurement by laser diffraction method and to chemical analysis. An average particle diameter measured by particle size distribution measurement and the respective numbers of moles of the individual elements to the total number of moles of Ni+Co (Ni+Co=1) resulting from chemical analysis are shown in Table 1.

Then, a positive electrode for a lithium secondary battery was produced from the resulting positive electrode material powder and the characteristics of lithium secondary battery were evaluated by a method which will be described later. Table 2 shows the result of evaluation.

Comparative Example

The production of the positive electrode material powder and the positive electrode was performed by using the same raw materials and performing the same firing process as used and performed in Example 1, except for the blending compositions that had been changed.

The components and the characteristics of lithium secondary battery are shown in Tables 1 and 2 in the same manner as in Example 1.

TABLE 1

| No. | Firing temperature (° C.) | Holding time (Hr) | Total composition | Average particle diameter (μm) |
|---|---|---|---|---|
| Example | | | | |
| 1 | 750 | 8 | Li$_{1.14}$Ni$_{0.8}$Co$_{0.2}$Ba$_{0.004}$Al$_{0.04}$ | 14.3 |
| 2 | 800 | 5 | Li$_{1.12}$Ni$_{0.8}$Co$_{0.2}$Ba$_{0.003}$Al$_{0.03}$Si$_{0.007}$ | 14.5 |
| 3 | 775 | 6 | Li$_{1.09}$Ni$_{0.8}$Co$_{0.2}$BA$_{0.007}$Al$_{0.08}$Si$_{0.005}$ | 15.8 |
| 4 | 725 | 10 | Li$_{1.04}$Ni$_{0.8}$Co$_{0.2}$Ba$_{0.001}$Al$_{0.03}$P$_{0.005}$ | 15.7 |
| 5 | 800 | 5 | Li$_{1.05}$Ni$_{0.7}$Co$_{0.3}$Ba$_{0.003}$Al$_{0.03}$B$_{0.006}$ | 10.3 |

TABLE 1-continued

| No. | Firing temperature (°C.) | Holding time (Hr) | Total composition | Average particle diameter (μm) |
|---|---|---|---|---|
| 6 | 775 | 10 | $Li_{1.08}Ni_{0.8}Co_{0.2}Ba_{0.004}Al_{0.03}Na_{0.004}Si_{0.004}$ | 16.1 |
| 7 | 750 | 6 | $Li_{1.09}Ni_{0.9}Co_{0.1}Ba_{0.005}Al_{0.04}K_{0.006}B_{0.003}$ | 8.3 |
| Comp. Ex. | | | | |
| 1 | 775 | 6 | $Li_{0.99}Ni_{0.8}Co_{0.2}Ba_{0.002}Sr_{0.001}$ | 15.1 |
| 2 | 800 | 5 | $Li_{1.02}Ni_{0.8}Co_{0.2}$ | 15.3 |
| 3 | 750 | 8 | $Li_{0.98}Ni_{0.9}Co_{0.1}Ba_{0.02}$ | 8.5 |
| 4 | 775 | 10 | $Li_{1.01}Ni_{0.9}Co_{0.1}Sr_{0.01}Ba_{0.01}$ | 8.1 |
| 5 | 750 | 8 | $Li_{1.12}Ni_{0.8}Co_{0.2}Al_{0.04}$ | 14.2 |
| 6 | 750 | 7 | $Li_{1.08}Ni_{0.8}Co_{0.2}Ba_{0.004}$ | 14.1 |

TABLE 2

| No. | Total composition | Discharge capacity (mAh/g) | Charge/discharge efficiency (%) | Rate performance (%) | Cycle performance (%) | High temperature storage performance (%) | Power output performance (W/g) | Nail penetration test |
|---|---|---|---|---|---|---|---|---|
| Example | | | | | | | | |
| 1 | $Li_{1.14}Ni_{0.8}Co_{0.2}Ba_{0.004}Al_{0.04}$ | 180 | 90.1 | 92.3 | 93.4 | 95.5 | 14.2 | Passed |
| 2 | $Li_{1.12}Ni_{0.8}Co_{0.2}Ba_{0.003}Al_{0.03}Si_{0.007}$ | 181 | 90.2 | 91.4 | 94.2 | 96.0 | 12.8 | Passed |
| 3 | $Li_{1.09}Ni_{0.8}Co_{0.2}Ba_{0.007}Al_{0.08}Si_{0.005}$ | 182 | 90.8 | 91.9 | 93.5 | 96.1 | 13.3 | Not performed |
| 4 | $Li_{1.04}Ni_{0.8}Co_{0.2}Ba_{0.001}Al_{0.03}P_{0.005}$ | 180 | 91.1 | 91.5 | 95.0 | 95.8 | 13.7 | Not performed |
| 5 | $Li_{1.05}Ni_{0.7}Co_{0.3}Ba_{0.003}Al_{0.03}B_{0.006}$ | 180 | 91.3 | 91.4 | 94.2 | 95.4 | 13.5 | Not performed |
| 6 | $Li_{1.08}Ni_{0.8}Co_{0.2}Ba_{0.004}Al_{0.03}Na_{0.004}Si_{0.004}$ | 181 | 91.2 | 91.4 | 93.5 | 94.9 | 13.0 | Passed |
| 7 | $Li_{1.09}Ni_{0.9}Co_{0.1}Ba_{0.005}Al_{0.04}K_{0.006}B_{0.003}$ | 180 | 90.5 | 91.5 | 93.4 | 94.5 | 13.2 | Not performed |
| Comp Ex. | | | | | | | | |
| 1 | $Li_{0.99}Ni_{0.8}Co_{0.2}Ba_{0.002}Sr_{0.001}$ | 180 | 85.2 | 84.1 | 90.4 | 82.6 | 6.8 | Passed |
| 2 | $Li_{1.02}Ni_{0.8}Co_{0.2}$ | 188 | 83.5 | 81.5 | 80.7 | 82.0 | 3.5 | Failed |
| 3 | $Li_{0.98}Ni_{0.9}Co_{0.1}Ba_{0.2}$ | 160 | 84.2 | 82.8 | 82.7 | 81.6 | 6.5 | Failed |
| 4 | $Li_{1.01}Ni_{0.9}Co_{0.1}Sr_{0.01}Ba_{0.01}$ | 162 | 85.6 | 82.7 | 81.9 | 81.3 | 5.9 | Failed |
| 5 | $Li_{1.12}Ni_{0.8}Co_{0.2}Al_{0.04}$ | 172 | 89.2 | 90.1 | 88.7 | 93.3 | 8.5 | Failed |
| 6 | $Li_{1.08}Ni_{0.8}Co_{0.2}Ba_{0.004}$ | 180 | 86.4 | 85.5 | 90.1 | 83.2 | 7.1 | Passed |

Example 2

An initial product was obtained by using the same raw materials and the same firing method as used in Example 1 indicated by No. 1. Added components shown in Table 3 were added to the initial product, re-firing was performed in an oxygen atmosphere, and the fired materials were crushed to provide positive electrode material powders. Average particle diameters were measured by laser diffraction method and the numbers of moles of the individual elements were measured by chemical analysis, which are shown in Table 3.

In Nos. 8 to 11, an amorphous phase of an oxide is formed at the surface of each of particles. In Nos. 12 and 13, an amorphous phase of an oxide is formed within each of particles and at the surface thereof.

Then, positive electrodes for a lithium secondary battery were produced therefrom. The positive electrode characteristics were evaluated by the method which will be described later. Table 4 shows the result of evaluation.

TABLE 3

| | | Initial firing | | | Re-firing | | Final product | |
|---|---|---|---|---|---|---|---|---|
| No. | Compound composition | Firing temperature (° C.) | Holding time (Hr) | Added components | Firing temperature (° C.) | Holding time (Hr) | Total composition | Average particle diameter (μm) |
| 8 | Li—Ni—Co—Ba—Al—O | 775 | 3 | $Al_2O_3$ | 600 | 5 | $Li_{1.07}Ni_{0.9}Co_{0.1}Ba_{0.003}Al_{0.06}$ | 8.2 |
| 9 | Li—Ni—Co—Ba—Al—O | 750 | 5 | $SiO_2$ | 500 | 4 | $Li_{1.08}Ni_{0.9}Co_{0.1}Ba_{0.005}Al_{0.06}Si_{0.005}$ | 8.4 |
| 10 | Li—Ni—Co—Ba—Al—O | 725 | 7 | $P_2O_5$ | 600 | 3 | $Li_{1.11}Ni_{0.8}Co_{0.2}Ba_{0.0006}Al_{00.4}P_{0.006}$ | 15.1 |
| 11 | Li—Ni—Co—Ba—Al—O | 750 | 5 | $H_3BO_3$ | 750 | 2 | $Li_{1.12}Ni_{0.8}Co_{0.2}Ba_{0.007}Al_{0.02}B_{0.008}$ | 15.8 |
| 12 | Li—Ni—Co—Ba—Al—Si—O | 800 | 10 | $NaNO_3$ | 700 | 1 | $Li_{1.11}Ni_{0.8}Co_{0.2}Ba_{0.003}Al_{0.02}Na_{0.005}Si_{0.004}$ | 15.6 |
| 13 | Li—Ni—Co—Ba—Al—B—O | 800 | 10 | $KNO_3$ | 775 | 2 | $Li_{1.14}Ni_{0.8}Co_{0.2}Ba_{0.006}Al_{0.03}K_{0.004}B_{0.005}$ | 15.5 |

TABLE 4

| No. | Total composition | Discharge capacity (mAh/g) | Charge/discharge effiiency (%) | Rate performance (%) | Cycle performance (%) | High temperature storage performance (%) | Power output performance (W/g) | Nail penetration Test |
|---|---|---|---|---|---|---|---|---|
| 8 | $Li_{1.07}Ni_{0.9}Co_{0.1}Ba_{0.003}Al_{0.06}$ | 184 | 90.9 | 92.5 | 92.7 | 93.8 | 13.1 | Not performed |
| 9 | $Li_{1.08}Ni_{0.9}Co_{0.1}Ba_{0.005}Al_{0.06}Si_{0.005}$ | 185 | 91.3 | 93.1 | 92.3 | 94.1 | 12.9 | Passed |
| 10 | $Li_{1.11}Ni_{08}Co_{02}Ba_{0.0006}Al_{0.04}P_{0.006}$ | 184 | 90.2 | 92.8 | 92.2 | 94.8 | 13.4 | Not performed |
| 11 | $Li_{1.12}Ni_{0.8}Co_{0.2}Ba_{0.007}Al_{0.02}B_{0.008}$ | 184 | 90.8 | 92.9 | 92.4 | 94.2 | 13.8 | Passed |
| 12 | $Li_{1.11}Ni_{0.8}Co_{0.2}Ba_{0.003}Al_{0.02}Na_{0.005}Si_{0.004}$ | 185 | 90.8 | 93.0 | 94.2 | 95.7 | 13.6 | Not performed |
| 13 | $Li_{1.14}Ni_{0.8}Co_{0.2}Ba_{0.006}Al_{0.03}K_{0.004}B_{0.005}$ | 184 | 91.4 | 92.7 | 93.9 | 95.3 | 13.6 | Passed |

The method for evaluating the positive electrode characteristics will be shown herein below. N-methyl-2-pyrrolidone was added to a total of 90 mass % of each of the positive electrode material for a lithium secondary battery obtained in the examples and comparative examples, 5 mass % of acetylene black, and 5 mass % of polyvinylidene fluoride and all together kneaded sufficiently. An aluminum substratum with a thickness of 20 μm was each coated with the resulting mixtures to be dried, pressed by a roller press to have a thickness of 80 μm, and punched out to provide samples each having a diameter of 14 mm. The samples were then vacuum dried at 150° C. for 15 hours to provide positive electrodes. A lithium metal sheet was used as a negative electrode material, while a porous film made of polypropylene was used as a separator. As an electrolyte, a solution prepared by dissolving 1 mol of $LiPF_6$ in 1 liter of an ethylene carbonate (EC)/dimethyl carbonate (DMC) mixture at a volume ratio of 1:1 was used. Test cells were assembled in argon substituted glove boxes. The charge capacities and discharge capacities were determined in the range of 3.0 to 4.2 V at a constant current density of 1.0 mA/cm². Further, the first charge/discharge efficiency was calculated by the following expression:

The first charge/discharge efficiency (%)=(the first discharge capacity)/(the first charge capacity)× 100.

The rate performances were measured by further performing charge/discharge measurement in the range of 3.0 to 4.2 V at a constant current density of 5.0 mA/cm² and calculated in accordance with the following numerical expression:

Rate Performance (%)={(Discharge Capacity at 5.0 mA/cm²)/(Discharge Capacity at 1.0 mA/cm²)}× 100.

The cycle performances were measured up to 100 cycles by assembling similar test cells and performing charge/discharge measurement in the range of 3.0 to 4.2 V at a constant current density of 5.0 mA/cm² and calculated in accordance with the following numerical expression:

Cycle Performance (%)={(Discharge Capacity in 100-th Cycle)/(Discharge Capacity in 1st Cycle)}× 100.

The high temperature storage performances were measured similarly as the rate performance. Test cells were assembled and charge/discharge measurement was performed in the range of 3.0 to 4.2 V at a constant current density of 5.0 mA/cm². Discharge capacities were measured before high temperature storage, and charging was performed for 8 hours at a constant current density of 5.0 mA/cm² until 4.2 V. The charged test cells were stored for 20 days in the chamber adjusted to constant temperature of 60° C., then, retrieved and left till cooled down to room temperature. Further, discharge capacity after performing high temperature storage in the range of 3.0 to 4.2 V at a constant current density of 5.0 mA/cm² was measured. The high temperature storage performance was calculated by the following expression:

The high temperature storage performance(%) =

(Discharge capacity after high temperature storage)/

(Discharge capacity before high temperature storage) × 100.

The power output performances were measured as follows. N-methyl-2-pyrrolidone was added to 90 mass % of each of the positive electrode material powders for a lithium secondary battery obtained in the examples and comparative examples, 5 mass % of acetylene black, and 5 mass % of polyvinylidene fluoride and all together kneaded sufficiently. An aluminum substratum with a thickness of 20 μm was coated with the resulting mixtures to be dried, pressed by a roller press to have a thickness of 65 μm, and punched out to provide samples each having a diameter of 10 mm. The samples were then vacuum dried at 150° C. for 15 hours to provide positive electrodes. A lithium metal sheet was used as a negative electrode material, while a porous film made of polypropylene was used as a separator. As an electrolyte, a solution prepared by dissolving 1 mol of LiPF$_6$ in 1 liter of an ethylene carbonate (EC)/dimethyl carbonate (DMC) solution mixture at a volume ratio of 1:1 was used. Test cells were assembled in glove boxes substituted with argon. After constant-current and constant-voltage charging was performed at a constant current density of 1.0 mA/cm$^2$ for 8 hours till 4.25 V, voltages when discharging was performed for 10 seconds at current densities of 3.0, 6.0, and 9.0 mA/cm$^2$ at 50% of a depth of discharge reached as a result of discharging performed at a constant current density of 1.0 mA/cm$^2$ were measured. Internal resistances R and open-circuit voltages V$_0$ were obtained using a regression line of the measured current value and voltage value. And power output performances W/g were calculated in accordance with the following numerical expression by assuming that the mass of an active material in each of the positive electrodes was represented by m.

$$W/g=V_0 \times 2.5/R/m.$$

A lithium secondary battery for a nail penetration test was prepared as follows.

89 mass % of the positive electrode material powder for a lithium secondary battery synthesized in Example 1, 6 mass % of acetylene black, and 5 mass % of polyvinylidene fluoride were mixed. N-methyl-2-pyrrolidone was added to the mixture and sufficiently kneaded. An aluminum substratum with a thickness of 20 μm was coated with the resulting mixture to be dried and then pressed, whereby a positive electrode was produced. In the meantime, N-methyl-2-pyrrolidone was added to a total of 92 mass % of carbon black, 3 mass % of acetylene black, and 5 mass % of polyvinylidene fluoride and all together kneaded sufficiently. A copper substratum with a thickness of 14 μm was coated with the resulting mixture to be dried and then pressed, whereby a negative electrode was produced. The respective thicknesses of the positive and negative electrodes were 75 μm and 100 μm. A 60 mm×35 mm rectangle battery with a thickness of 4 mm was prepared by using, as an electrolyte, a solution prepared by dissolving 1 mol of LiPF$_6$ in 1 liter of an ethylene carbonate (EC)/dimethyl carbonate (DMC) solution mixture at a volume ratio of 1:1, using a porous film made of polypropylene as a separator, and using an aluminum-laminated film bag. Charging was performed at a current value of 160 mA till 4.2 V. A discharge capacity was measured at the same current value down to 3.0 V, which was 780 mAh.

Batteries according to Examples Nos. 4, 9, 11, and 13 and Comparative Examples Nos. 2, 5, and 6 were produced by the same method using the respective positive electrode material powders for a lithium secondary battery synthesized under the individual conditions.

The nail penetration test was conducted by charging each of the batteries at a constant current value of 160 mA and with a constant voltage for 8 hours till 4.2V. Then, the center portion of each of the batteries was penetrated by a nail with a diameter of 2.5 mm at a rate of 15 mm/second and the states of the batteries after penetration were observed. In the case of no fuming, no ignition, and no rupture, the battery was judged to have passed the test. If any fuming, ignition, or the like was observed, the battery was judged to have failed.

What is claimed is:

1. A positive electrode material for a lithium secondary battery, which is a composite oxide powder having a total composition represented by Li$_a$Ni$_b$CO$_c$Ba$_d$Al$_e$O$_x$ where:
   a/(b+c): 1.0 to 1.2
   b/(b+c): 0.5 to 0.95
   c/(b+c): 0.05 to 0.5
   d/(b+c): 0.0005 to 0.007
   e/(b+c): 0.01 to 0.1
   b+c=1
   x>0.

2. The positive electrode material for a lithium secondary battery according to claim 1, wherein an amorphous phase of an oxide is dispersed within a particle of the composite oxide powder.

3. The positive electrode material for a lithium secondary battery according to claim 1, wherein an amorphous phase of the oxide is formed on a surface portion of a particle of the composite oxide powder.

4. The positive electrode material for a lithium secondary battery according to claim 1, wherein an amorphous phase of the oxide is dispersed within a particle of the composite oxide powder and is also formed at a surface of the particle.

5. The positive electrode material for a lithium secondary battery according to claim 2 wherein a constituent component of the amorphous phase of the oxide is an oxide of one or a plurality of elements selected from the group consisting of Li, Ba, and Al.

6. The positive electrode material for a lithium secondary battery, which is a composite oxide having a total composition represented by Li$_a$Ni$_b$CO$_c$Ba$_d$Al$_e$M$_f$O$_x$ where:
   M: one or a plurality of elements selected from the group consisting of Na, K, Si, B, and P,
   a/(b+c): 1.0 to 1.2
   b/(b+c): 0.5 to 0.95
   c/(b+c): 0.05 to 0.5
   d/(b+c): 0.0005 to 0.007
   e/(b+c): 0.01 to 0.1
   f/(b+c): 0.01 or less (not inclusive of 0)
   b+c=1
   x>0.

7. The positive electrode material for a lithium secondary battery according to claim 6, wherein the composite oxide is a powder, a particle of which has an amorphous phase of an oxide dispersed within the particle.

8. The positive electrode material for a lithium secondary battery according to claim 6, wherein the composite oxide is a powder, a particle of which has an amorphous phase of an oxide on a surface of the particle.

9. The positive electrode material for a lithium secondary battery according to claim 6, wherein the composite oxide is a powder, a particle of which has an amorphous phase of an oxide dispersed within the particle and also formed on a surface of the particle.

10. A lithium secondary battery comprising a positive electrode composed of the positive electrode material for a lithium secondary battery as recited in claim 1.

* * * * *